United States Patent
Har-Chen et al.

(10) Patent No.: US 6,429,902 B1
(45) Date of Patent: Aug. 6, 2002

(54) METHOD AND APPARATUS FOR AUDIO AND VIDEO END-TO-END SYNCHRONIZATION

(75) Inventors: Dror Har-Chen; Ariel Cohen, both of Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/457,117

(22) Filed: Dec. 7, 1999

(51) Int. Cl.[7] .............................. H04N 5/04; H04N 9/44; H04N 9/475; H04N 7/00; H04L 7/00; H04L 7/04; H04L 7/06

(52) U.S. Cl. ....................... 348/518; 348/512; 348/464; 348/515; 348/824.1; 375/355; 375/362; 375/363; 375/364; 375/365

(58) Field of Search ................... 348/500, 512, 348/464, 518, 515, 824.1; 375/355, 362, 363, 364, 365; H04N 9/44

(56) References Cited

U.S. PATENT DOCUMENTS 5,768,326 A * 6/1998 Koshiro et al. ............. 375/376
5,771,075 A * 6/1998 Rim et al. .................. 348/512
5,818,539 A * 10/1998 Naimpally et al. ......... 348/512
5,966,387 A * 10/1999 Cloutier ..................... 370/516
6,072,832 A * 6/2000 Katto ......................... 375/240
6,101,591 A * 8/2000 Foster et al. ................ 711/219
6,118,486 A * 9/2000 Reitmeir .................... 348/441
6,175,604 B1 * 1/2001 Noro et al. ................. 375/364
6,192,074 B1 * 2/2001 Birks ......................... 375/240
6,313,879 B1 * 11/2001 Kubo et al. ................. 348/512

* cited by examiner

*Primary Examiner*—John Miller
*Assistant Examiner*—Paulos Natnael
(74) *Attorney, Agent, or Firm*—Thelen, Reid & Priest, LLP

(57) ABSTRACT

A method and apparatus for synchronization of an audio/visual bitstream is transmitted by an encoder and received by a decoder by employing duplication or elimination of audio samples and video pixels. The invention enables clock synchronization between the encoder and a decoder with an unregulated clock oscillator so as to control the data reader by skipping ahead (eliminating a data element) or to pause (duplicating a data element) depending on whether the encoder clock is faster or slower than the decoder clock.

46 Claims, 6 Drawing Sheets

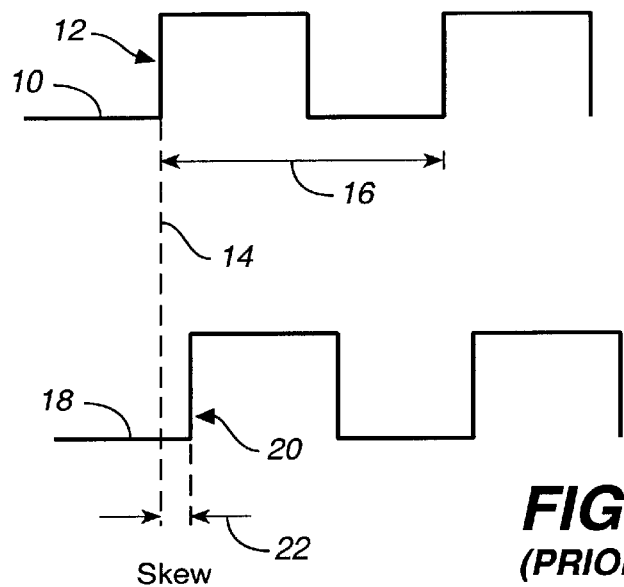
FIG._1
(PRIOR ART)
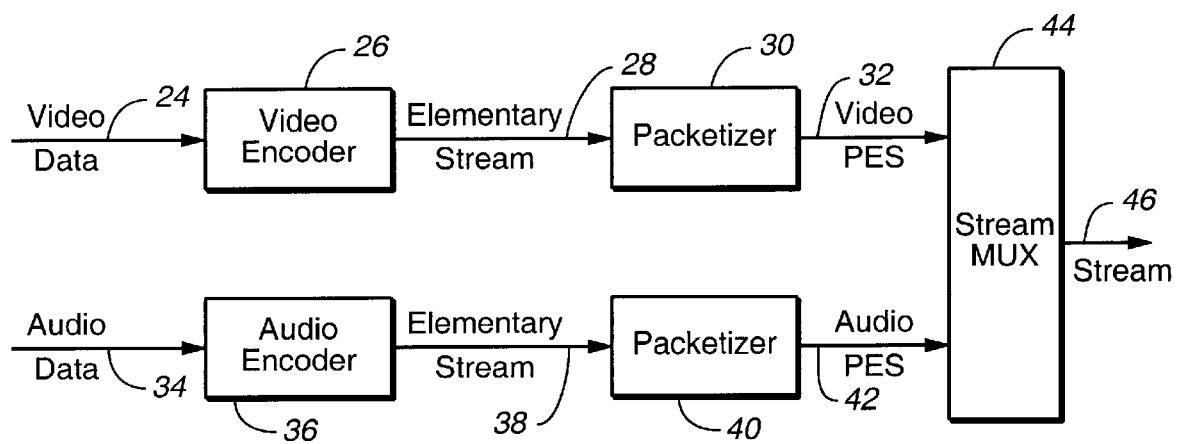
FIG._2
(PRIOR ART)

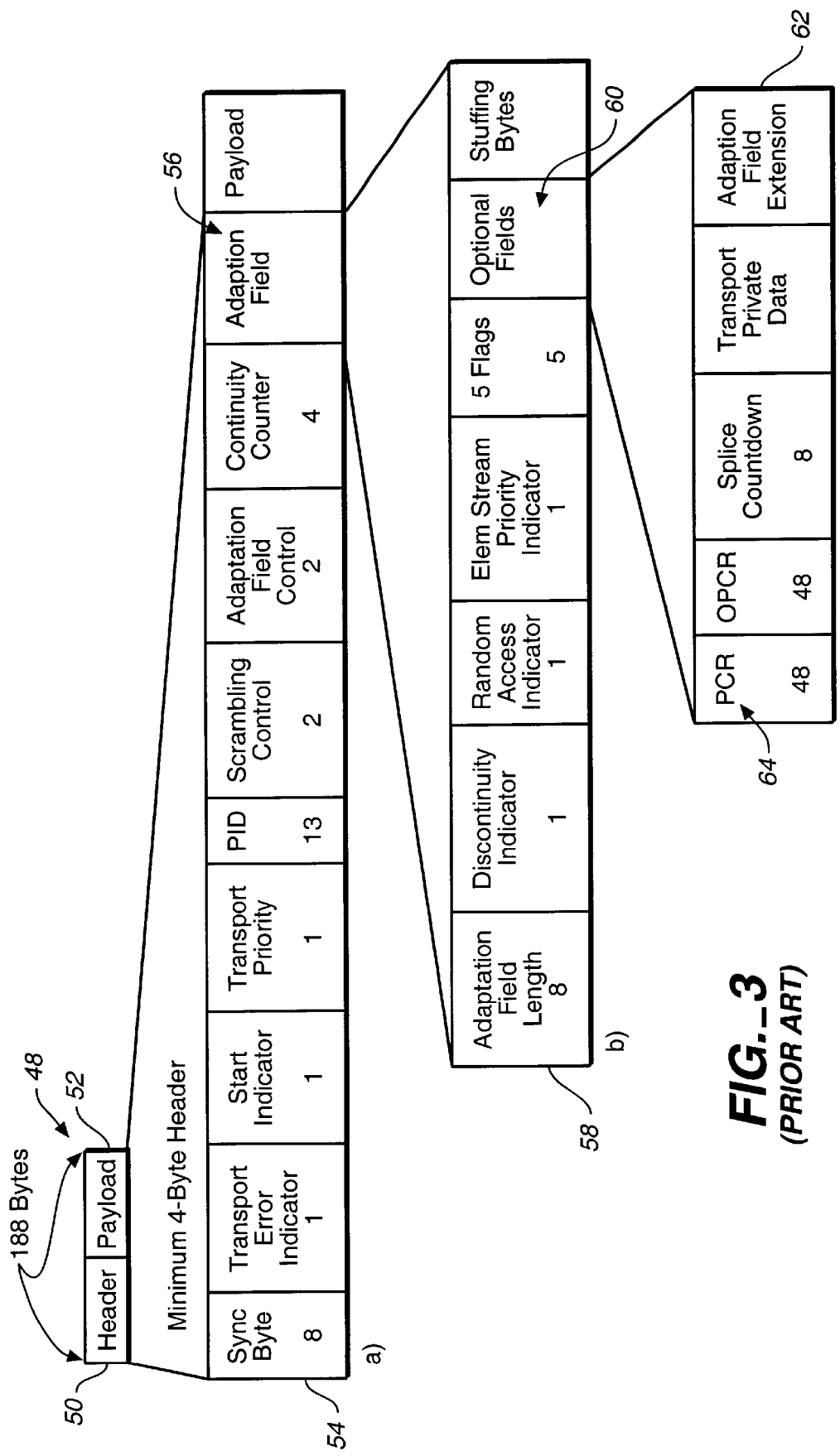
FIG._3 (PRIOR ART)

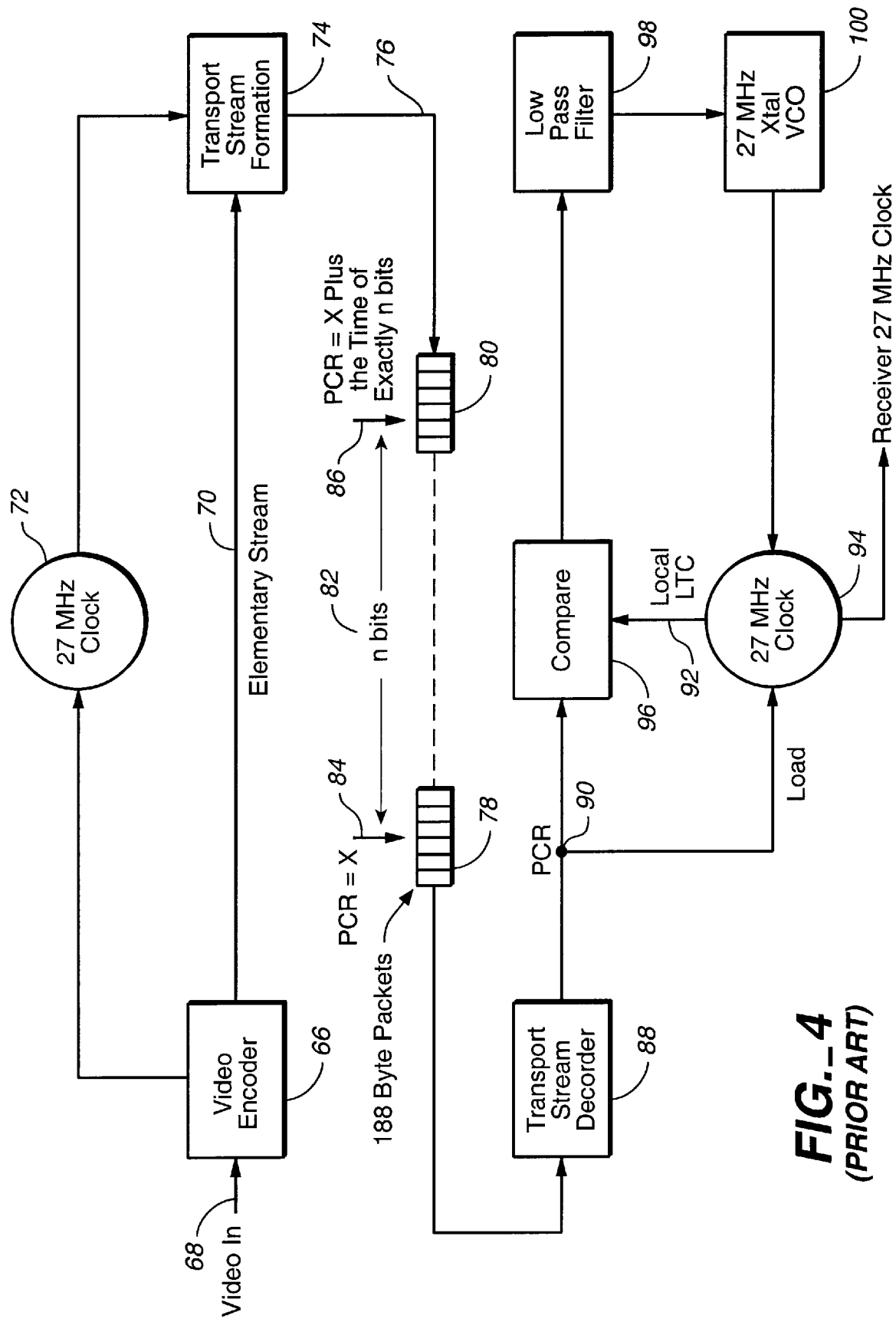
FIG._4 (PRIOR ART)

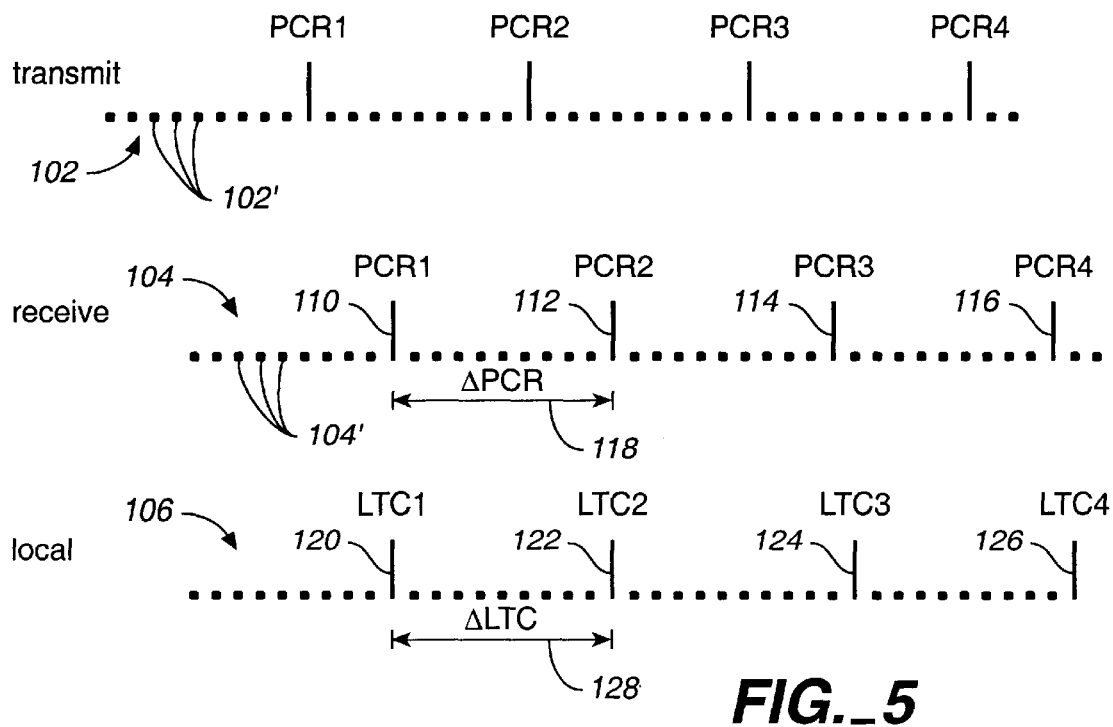
FIG._5
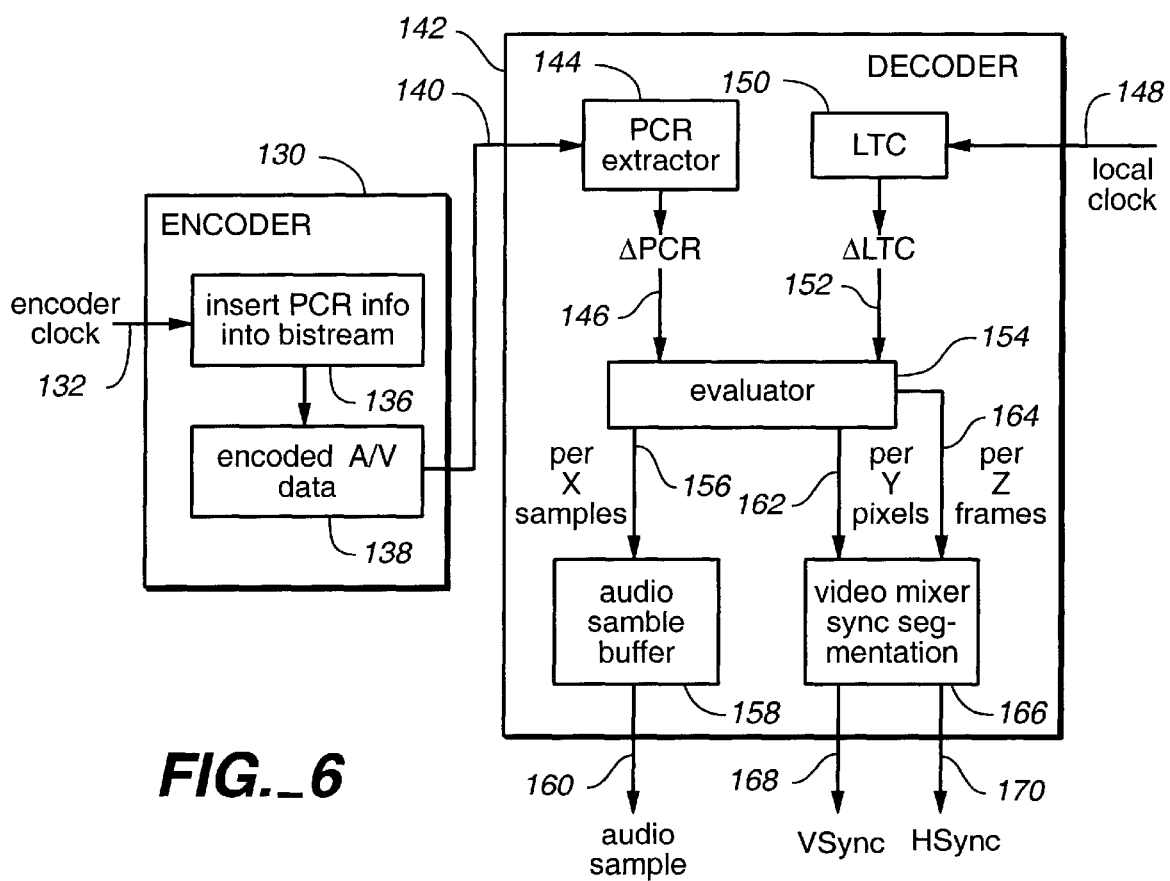
FIG._6

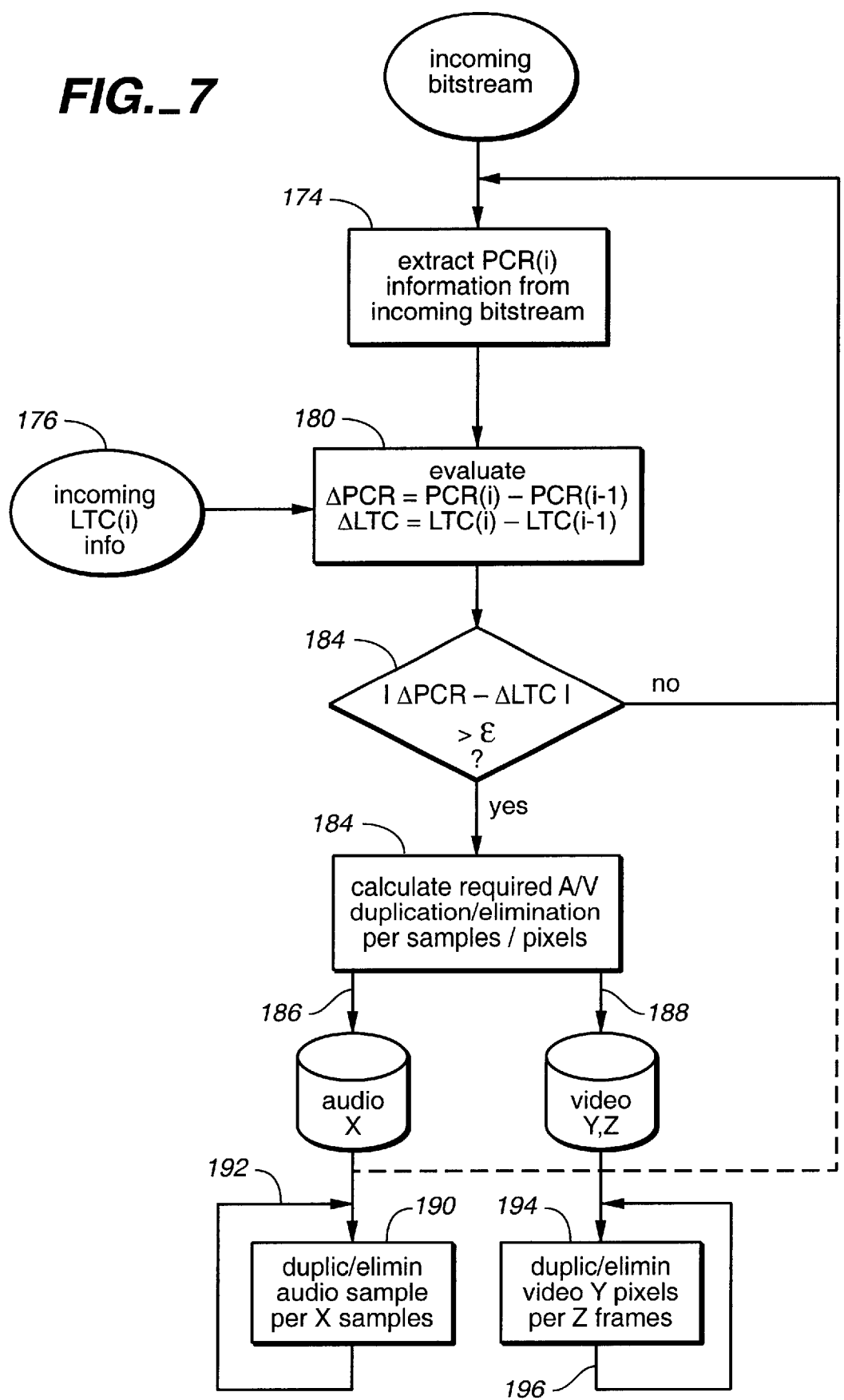
FIG._7

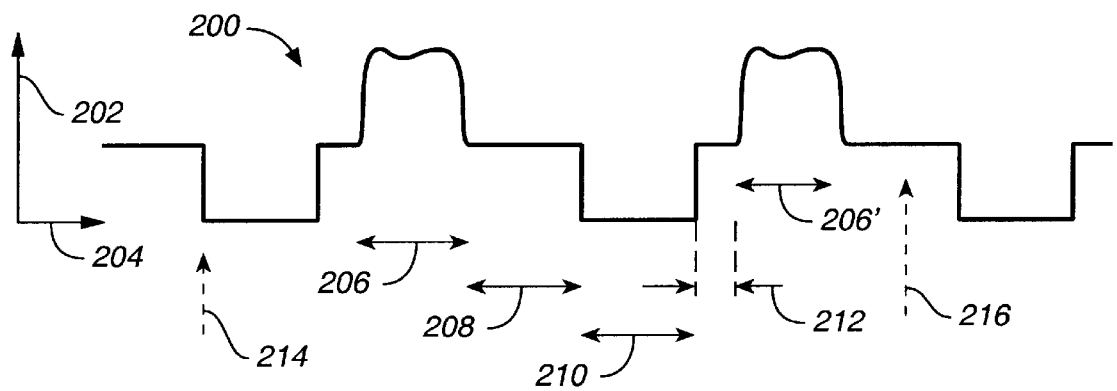
FIG._8
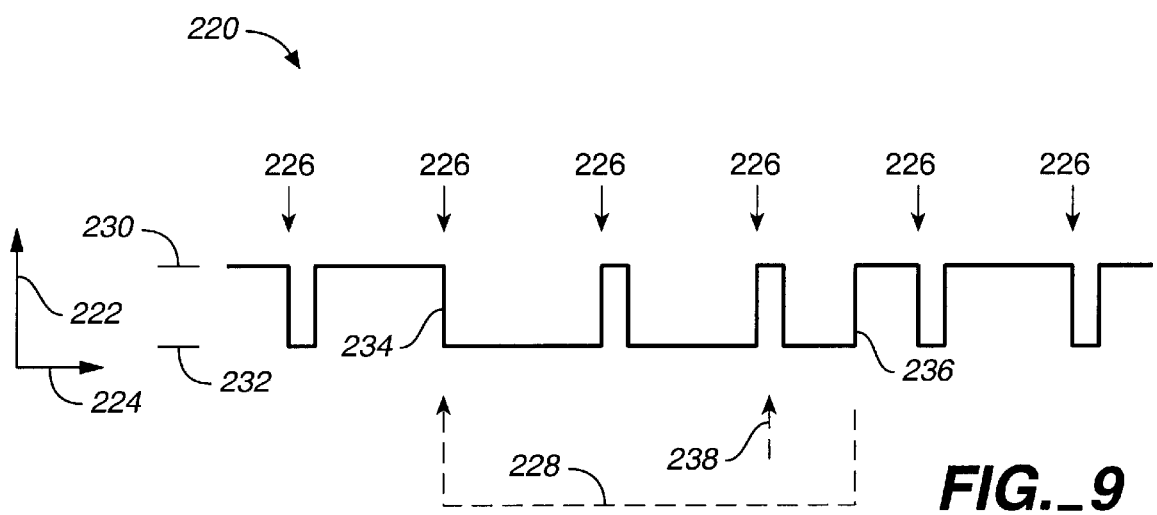
FIG._9

METHOD AND APPARATUS FOR AUDIO AND VIDEO END-TO-END SYNCHRONIZATION

FIELD OF THE INVENTION

The present invention relates to end-to-end signal synchronization between an encoder and a decoder.

BACKGROUND OF THE INVENTION

Moving images and associated sound may be transmitted as audio/visual (A/V) signals and represented to viewers by receivers having video displays and audio speakers. A Set-Top Box (STB) represents an example device commonly used to receive such A/V signals. The STB, so called because this standalone signal converter is typically placed above the video display of a television receiver, may receive transmitted encoded A/V signals (sent by cable, broadcast or via satellite) and decode these signals for displaying on the television. For A/V signals to be enjoyed by a consumer without degradation in image frames or sound fidelity, the audio and video bitstreams must be synchronized based on standards used in the industry.

In order for two waveforms to be synchronized, their wavelengths and their phase must be matched. The time difference between corresponding events may be described as "skew", and FIG. 1 illustrates an example. A first square-wave 10 has a first step rise event 12 corresponding to a particular time 14. The wavelength of the first square-wave provides a measure of its period 16. A second square-wave 18 has a second step rise event 20 a finite time interval later than the first step rise event 12, and this difference may be described as the skew 22.

The transmission of A/V data into a single bitstream as shown in FIG. 2 requires several processes. Video data 24 are input to a video encoder 26 yielding a video elementary stream 28 that is input to a video packetizer 30, producing a video packetized elementary stream (PES) 32. The corresponding audio data 34 are input to an audio encoder 36 to produce an audio elementary stream 38 that is input to an audio packetizer 40 producing an audio PES 42. The video PES 32 and audio PES 42 are input to a stream multiplexer (MUX) 44 from which a resulting bitstream 46 is transmitted. Upon reception, the bitstream must be separated into audio and video streams and synchronized for decoding.

Synchronization of an encoder and a decoder involves sending program clock reference (PCR) time stamps (or counts) embedded by the encoder in the A/V transport bitstream and received by the decoder on the STB. The PCR time stamps provide a sample of the encoder clock count sent in the transport stream packet. The encoder clocks drive a constantly running binary counter. The value of these counters is sampled periodically and placed in the header adaptation fields as the PCR. The decoder compares the received PCR time-stamps from the packet header to its corresponding time stamps from a local time counter (LTC), in order to synchronize the A/V presentation for decoding. The short-term history of the PCR increments relative to their LTC counterparts provides the relation between the local decoder's clock and the encoder's clock. The difference may represent skew or phase error. Typically, the decoder's system clock is adjusted to match that of the encoder to avoid loss of A/V bitstream data.

The synchronization of system coding is defined by the International Standards Organization (ISO) in ISO-13818-1 titled *Information Technology—Generic Coding of Moving Pictures and Associated Audio Information, Part 1: Systems* (November 1994). ISO-13818-1 specifies a multiplexed structure for combining audio and video data along with the representation of the timing information needed to replay synchronized sequences in real-time. Compression of the A/V bitstream is standardized by the Moving Photographers Expert Group (MPEG), e.g., standards such as MPEG-1, MPEG-2, MPEG-4 and MPEG-7. The target timebase frequency for the ISO-13181-1 system clock is 27 megahertz (MHz) with a variation of ±30 parts per million (ppm).

The PCR time stamp, used for the MPEG-2 transport standard, represents a small portion of a 188-byte packet as illustrated in FIG. 3 showing the packet 48 divided into a header 50 and a payload 52. The header is subdivided into several fields, in the first expanded row 54, including an adaptation field 56. Expansion of the adaptation field 56 yields a second expanded row 58, which includes an entry for optional fields 60. Expansion of the optional fields 60 yields a third expanded row 62, within which is contained the PCR 64.

The common synchronization method for coder/decoder (codec) end-to-end communication uses an external VCxO component to control the STB master clock frequency that establishes the encoder operating frequency, and to synchronize the decoder operating frequency so as to match the encoder operating frequency. The VCxO is an oscillator with a dynamic range connected to a voltage control input pin. The decoder can regulate its clock frequency by altering the VCxO control input voltage in response to the encoder clock PCR time stamps received by the decoder.

The codec clock comparison may be illustrated in FIG. 4 in which a remotely located video encoder 66 receives a input video signal 68 and outputs an elementary stream 70 that is combined with the frequency of the encoder clock 72 for the transport stream formation device 74. The bitstream 76 includes a first packet 78 and a second packet 80 separated by n bits of data 82 transmitted over the time between packets $t_n$. PCR time stamps labeled "X" 84 and "X+$t_n$" 86 are embedded within the first and second packets 78 and 80 respectively. At the local STB, the bitstream 76 is received by a transport stream decoder 88, which forwards the PCR 90 and the LTC 92 from the local clock 94 to the time-difference comparison device 96. After sending the time-difference to a low pass filter 98, the time-difference is sent to a variable oscillator 100 that uses the filtered time-difference to adjust the local clock 94 so as to be synchronized with the encoder clock 72.

The arrangement of synchronizing a local clock to a remote clock requires an external component with multiple-pin connections to be installed on the STB. The incorporation of a variable voltage oscillator at current prices on a STB having only modest sophistication represents an additional expense not commensurate to the value of the synchronization function and its application for STB signal decoding.

SUMMARY OF THE INVENTION

A method and apparatus for synchronization of an audio/visual bitstream is transmitted by an encoder and received by a decoder by employing duplication or elimination of audio samples and video pixels. The invention enables clock synchronization between the encoder and a decoder with an unregulated clock oscillator so as to control the data reader by skipping ahead (eliminating a data element) or to pause (duplicating a data element) depending on whether the encoder clock is faster or slower than the decoder clock.

BRIEF DESCRIPTION OF THE FIGURES

FIG. 1 is a timing diagram of two square waves illustrating skew.

FIG. 2 is a block diagram of a scheme for A/V multiplexing in accordance with the prior art.

FIG. 3 is a block diagram of a data packet that includes a program clock reference (PCR) in accordance with the prior art.

FIG. 4 is a block diagram of a system for adjusting a local clock receiving a video bitstream in accordance with the prior art.

FIG. 5 is a diagram illustrating a bitstream with embedded PCR time stamps compared to LTC time stamps according to a presently preferred embodiment of the present invention.

FIG. 6 is a system block diagram of an apparatus showing decoder operations to synchronize the bitstream according to a presently preferred embodiment of the present invention.

FIG. 7 is a flowchart of the process to synchronize the bitstream according to a presently preferred embodiment of the present invention.

FIG. 8 is a timing diagram illustrating a video line structure with horizontal blanking according to a presently preferred embodiment of the present invention.

FIG. 9 is a timing diagram illustrating a vertical synchronization structure according to a presently preferred embodiment of the present invention.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith.

The present invention relates to end-to-end signal synchronization for audio and video data components. Unlike past known methods and apparatuses that adjust the decoder's system clock to conform to the encoder's, the present invention changes the number of data elements, thereby removing the need for an independent adjustable clock. Instead of altering the frequency of the decoder clock (a local 27 MHz±30 ppm oscillator in one example) to match the encoder clock based on the PCR time stamps, the method disclosed duplicates or eliminates data elements in the bitstream. In this manner, the global flow of the A/V bitstream may be synchronized with the encoder, irrespective of whether or not the clocks of the encoder and the decoder are synchronized.

For example, in the event that the local decoder clock frequency is faster than that of the encoder, a data element may be duplicated to avoid underflow. Then, the read pointer for bitstream data input may be incremented by zero so that the previous data element is repeated without the pointer stepping forward, or while in pause mode. If instead, the local decoder clock frequency is slower than the encoder's frequency, a data element may be eliminated to avoid overflow. The read pointer for bitstream data input may be incremented by two so that the previous data element is skipped over when the pointer stepping forward, which may be called skipping ahead. If no difference between time stamps is determined, the read pointer may be incremented by one corresponding to each data element being read. The method distinguishes between audio data and video data by handling procedures, described separately below.

The STB system clock frequency is defined as 27 MHz±30 ppm according to ISO-13818-1 §2.4.2.1. This may be expressed as a specified frequency range: 26,999,190 Hz$\leq f_c \leq$27,000,810 Hz in which $f_c$ represents the system clock frequency. The jitter or rate of system clock frequency change (with time) is defined in the same section as less than or equal to 0.075 Hz/sec, such that $\partial f_c/\partial t \equiv \dot{f}_c \leq 0.075$ Hz/sec. The encoder sends PCR time stamps embedded in the MPEG-2 transport bitstream to the decoder, which compares the PCR time stamps to its local time counter (LTC) for synchronizing decoding operations and A/V presentation. The interval between two successive PCR time stamps forms a truncated history of the PCR. The comparison between PCR and LTC increments provides a relative difference between the decoder's own frequency and that of the transmitting encoder's clock.

The present invention duplicates or eliminates audio samples and video pixels according to this comparison of the PCR and LTC. Only one audio sample may be affected at each comparison, resulting in up to three samples/sec being duplicated or eliminated for a 60 ppm skew. The corresponding video effect for this skew would be 16 pixels per frame. The versatility of the invention enables bitstream synchronization over a wide range of conditions in the absence of a variably controllable oscillator clock.

In FIG. 5, a bitstream is illustrated with embedded PCR time stamps compared to LTC time stamps. A transmitted bitstream 102 containing bitstream data 102' for audio samples and video pixels is sent from the encoder. The corresponding received bitstream 104 containing these data 104' may be intercepted for the decoder, whose clock in turn creates a local countstream 106. A channel delay 108 produces a lag between the transmitted bitstream 102 and the received bitstream 104. The received PCR time stamps are labeled "PCR1" 110, "PCR2" 112, "PCR3" 114, and "PCR4" 116, continuing so forth. The interval between PCR time counts may be shown in this example as between PCR1 110 and PCR2 112 as "ΔPCR" 118. The counterpart LTC time counts are labeled "LTC1" 120, "LTC2" 122, "LTC3" 124, and "LTC4" 126, continuing so forth. The interval between LTC time counts may be shown between LTC1 120 and LTC2 122 as "ΔLTC" 128. If the LTC interval does not match the PCR interval, that is ΔPCR−ΔLTC≠0, then under the prior art the frequency of the decoder's oscillator that generates the LTC time stamps might be adjusted. With the present invention, no such adjustment is necessary. Instead, in accordance with the present invention, the received bitstream 104 may have audio samples and/or video pixels added by duplication or discarded by elimination based on the difference between the PCR and LTC intervals.

A diagram is provided in FIG. 6 showing decoder operations to synchronize the bitstream. An encoder 130 is synchronized by an encoder clock 132 and receives a bitstream 134 to encode. The sequencer 136 inserts PCR time stamp information from the clock signal into the received bitstream 134. The augmented bitstream is encoded as A/V data in the encoder 138 producing a transmitted bitstream 140, which is sent to the decoder 142. The input to the decoder 142 includes a PCR extractor 144, which compares the ΔPCR interval 146 between two successive PCR time stamps. A local clock 148 is input to a LTC sampling generator 150 from which the ΔLTC interval 152 can be determined. The ΔPCR interval 146 and the ΔLTC interval 152 are compared in an evaluator 154.

If a nonzero difference is found per X number of audio samples 156, an operation to duplicate or eliminate an audio sample for each X number may be implemented in an audio sample buffer 158 to produce a synchronized audio sample bitstream 160 for playback. If a nonzero difference is found of Y number of video pixels 162 is found per Z number of video frames 164, an operation to duplicate or eliminate a pixel may be implemented in a video mixer 166 to produce a synchronized video line that is in vertical synchronization 168 or horizontal synchronization 170. The bitstream is separated into the audio sample buffer 158 and the video mixer 166.

FIG. 7 shows a flowchart of the process to synchronize the bitstream. An incoming bitstream 172 represents the input to the extractor 174 for extracting PCR increment information from the incoming bitstream. Meantime the local clock provides the LTC increment information are provided as input 176. In an evaluator 178 subtracts succeeding extracted PCI increments as ΔPCR=PCR(i)−PCR(i−1) at the $i^{th}$ increment (over a time-packet interval). Similarly the evaluator 178 also subtracts succeeding LTC increments as ΔLTC=LTC(i)−LTC(i−1). A comparison evaluator 180 subtracts the local clock increment difference ΔLTC from the extracted difference ΔPCR.

If the comparative absolute difference is not greater than a specified tolerance ϵ, the operation returns to the input 182 between the bitstream 172 and the extractor 174, since no synchronization adjustment is required. If on the other hand, this difference is greater than tolerance ϵ, then a calculator 184 is employed to determine the required A/V duplication/elimination rate of audio samples and/or video pixels. For audio, the duplication/elimination rate is imposed for X samples in the audio bitstream 186, and the corresponding rate for video is imposed for Y pixels per Z frames in the video bitstream 188. The duplication/elimination audio operation 190 per X samples is continued in an audio loop 192. The duplication/elimination video operation 194 of Y pixels per Z frames is continued in a video loop 196. The synchronizing operation for bitstream duplication/elimination rate may return for an update 198 of the bitstream rate.

Audio Signals

In the worst-case (maximum jitter) example described below, source clock jitter is used to derive the occurrence of a single sample difference called N. The audio sample rate $f_s$ varies depending on the common audio supply. The divisor M represents the system clock frequency divided by the product of the sample rate and $2^8$ (or 256) over-sampling rate, and may be expressed as $M=f_c/256\ f_s$. For a time-based clock frequency of $f_c$=27 MHz and maximum permitted jitter of 0.075 Hz/sec, the sample rate variation may be found by the relation $f_s$=[27 MHz ±810 Hz]/[256 samples/cycle M].

For digital video disk (DVD), an audio sample rate of 48,000 samples per second (often denoted as 48.0 kHz) may be used, with a corresponding divisor M=1125/512= 2.19727. For this example, the maximum range in sample rate for ±30 ppm variation extends from $f_{s-}$=47,998.56 samples/sec for the encoder to $f_{s+}$=48,001.44 samples/sec for the decoder. The sample time difference Δ$t_s$ between the encoder and decoder represents the subtraction of the sample rate inverses or Δ$t_s$=1.25 nsec. Each sample that the encoder transmits, the decoder displays the same sample faster by the sample time difference Δ$t_s$. The number of samples in the decoding until there is a difference of one sample in the accumulated bitstream may be expressed as $n_s=[f_{s-}Δt_s]^{-1}$= 1/[47,998.56 samples/sec·1.25 nsec]$^{-1}$=16,667.2 samples per difference event. The value $n_s$ corresponds to the X sample count in FIGS. 6 and 7 for the maximum permitted jitter.

The time period between occurrences of N may be expressed by the relation $t_N=n_s/f_s$. For a sample rate of $f_s$=48,000 samples/sec, this time period becomes $t_N$=0.34723 sec. Since the interval between PCR time stamps may be no greater than 0.1 sec based on MPEG-2, a sample difference between the encoder and the decoder occurs, in the worst case for the television sampling rate, after 3.472 PCR independent events.

The time period for maximum jitter is summarized in the Table 1 below for example audio sample rates. Although DVD employs 48,000 samples/sec, other rates may be used, such as 44,100 samples/sec in compact disk (CD) players.

TABLE 1

Audio Event Time for Maximum Jitter

| Sample Rate $f_s$ (smpl/sec) | Divisor M | Time $t_N$ (sec) | Application |
|---|---|---|---|
| 32,000 | 3.29590 | 0.52084 | Lo-Fi |
| 44,056 | 2.39397 | 0.37831 | television |
| 44,100 | 2.39158 | 0.37794 | CD |
| 48,000 | 2.19727 | 0.34723 | DVD |
| 52,734.37 | 2.00000 | 0.31606 | synchronous |

The minimum jitter recognizable to the system using hardware counters may be determined by the maximum interval for a single count discrepancy between two successive PCR time stamps which is Δ$t_p$=0.1 second yielding a frequency of 10 H z. The minimum number of cycles between two successive PCR time stamps for a 27 MHz −30 ppm clock oscillator would be $n_c$=26,999,190 Hz·0.1 sec= 2,699,919 cycles. The value $n_c$ corresponds to the X count in FIGS. 6 and 7 for the minimum successive PCR jitter. The minimum difference between two counters is a single count, such that the frequency to generate this count discrepancy between two consecutive PCR time stamps would be $f_A$= $(n_c+1)/Δt_p$=26,999,200 Hz.

By contrast, the present invention can accumulate a history of the PCR time stamp adjustments, storing the last oscillator update as a relative beginning event and calculate the clock drift relative to that beginning event. An example application in the industry may count 262,144,000 clock cycles, and if a difference of ten clock ticks is accumulated, a duplication or elimination of a sample might be required. A sample discrepancy of ±10 from this number of samples for a 27 MHz encoder clock yields a corresponding reduction in decoder clock frequency of −1.03 Hz or −0.038 ppm. (An opposite discrepancy of −10 samples yields +1.03 Hz.) The corresponding number of samples until N occurs is $n_s$=26,213,592. The time period between occurrences of N may be expressed by the relation $t_N=n_s/f_s$. An audio sample rate of 48,000 samples/sec yields $t_N$=546.12 sec between adjustments.

The minimum size counter required to implement-such an instruction in hardware would be $2^{25}$ or 33,554,432 in order to accommodate a value of 26,114,400 samples. This corresponds to a 25-bit counter to count the audio samples between successive duplication or elimination operations.

(The next smallest counter is $2^{24}$ or 16,777,216, which would be inadequate.) If a 32-bit counter is substituted for the duplication or elimination operation of the audio sample, the time-accuracy of the system may be increased by two orders of magnitude, albeit at an increased consumption of silicon in the processing. Then, the number of samples until an N event would be $n_s$~4.1538·10$^9$. At the example audio sample rate of 48,000 samples/sec, the time between N events becomes $t_N$=86,538 sec.

The present invention permits accurate synchronization of the bitstream received by the decoder in the absence of hardware counters by employing software counters for comparing sample rates. A comparison may be taken between the sample rate for the received bitstream obtained from the encoder and the sample rate derived from the local oscillator clock at the decoder. The duplication or elimination of audio samples within the bitstream to be decoded may be based on that sample rate comparison.

The encoder/decoder clock ratio determines whether the audio playback system should correct by underflow or overflow so that accordingly, data elements are either duplicated or eliminated, respectively. The present invention duplicates or eliminates samples in a semi-trick mode (in which a "trick" represents a non-play process such as fast-forward, as is well known by those skilled in the art), by one sample at each time preventing underflow or overflow from occurring. The operation of duplication or elimination, even for the most severe jitter allowed by the ISO-13818-1 specification, will occur at rates not recognizable by the human user.

Video Signals

For video signals, the present invention duplicates or eliminates video pixels according to the comparative analysis performed on the PCR and LTC counts. The recommended period to duplicate or eliminate the pixels may be either in the horizontal synchronization (HSYNC) or the vertical synchronization (VSYNC), during the interval when no visible pixels are presented to the video encoder.

A single frame of 625×864 pixels yields 540,000 pixels per frame. The video display format runs at a frame rate of 27 MHz/540,000 pixels/frame=50 Hz frame rate, which is a much slower rate than the audio. Consistent with the above example, the number of clock cycles in each frame is [27 MHz±30 ppm]/50 Hz=540,000±16 cycles. Under the worst-case clock variation for the ISO-13818-1 standard, a frame presentation period may yield sixteen pixels differing in a screen of 625 lines×864 pixels per line composing a frame for the Phase-Alternation Line (PAL) system or in a corresponding screen of 525×858 pixels for the National Television Systems Committee (NTSC) standard. Left uncorrected, an accumulated difference might eventually result in visible image distortion.

For video presented with an oscillator running at a more accurate ±0.038 ppm, the corresponding clock frequency may be 27 MHz±1.03 Hz as described in the audio section for minimum jitter recognized by in 25-bit hardware. The video number of clock cycles per frame for this variation might be determined as [27 MHz±1.03 Hz]/50 Hz=540,000±0.0206 cycles. Consequently, a single-pixel difference may be generated after 97 frames composed of 625×864 pixels each). Similarly, for a frequency difference of 0.0065 Hz between the encoder and the decoder clocks, the video results are [27 MHz±0.0065 Hz]/50 Hz=540,000±0.00013 cycles per frame. This leads to one pixel difference being generated only after 8.30736·10$^9$ pixels or 15,384 frames, which correspond to the Y and Z counts, respectively in FIGS. 6 and 7.

The encoder/decoder clock ratio determines whether the video system should correct by underflow or overflow so that accordingly data elements are either duplicated or eliminated respectively. The smallest unit presented in the video system is a pixel, but the size term used in a full frame (composed of 625×864 pixels for PAL or 525×858 for NTSC) leads to a solution that differs from the audio system. The present invention includes two options for video pixel insertion: horizontal blanking and vertical blanking.

Horizontal blanking as depicted in FIG. 8 can be explained by a video line signal 200 as a function of amplitude 202 with respect to time 204 and being composed of four parts, active line 206, front porch blanking 208, horizontal synchronization pulse 210, and back porch blanking 212. A horizontal timing reference called the "leading edge of sync" 210 reduces amplitude by half between front porch blanking 208 and synchronization pulse 210. The flat portion at the bottom of the synchronization pulse 210 is known as the "sync tip" 214, which is followed by its trailing edge returning the waveform to a higher amplitude at back porch blanking 212. The video line signal 200 remains at blanking level amplitude during the back porch blanking 212 during which the display completes the horizontal "flyback" to the beginning of a new active line 206'. During the front porch blanking 208, the insertion or removal of a pixel 216 may be performed. The process of adding a pixel to or removing a pixel from the front porch blanking period will not affect the appearance of the video line 200, since it only delays the beginning of the horizontal synchronization reference 210.

Vertical blanking as depicted in FIG. 9 can be explained by a video line 220 in the amplitude axis 222 as a function of elapsed time 224. The vertical line 220 includes events of horizontal synchronization 226 and a vertical synchronization period 228. During the entire vertical synchronization period 228, the horizontal synchronization is also maintained. Adding or removing a pixel to the vertical synchronization period does not affect the vertical synchronization operation or the overall television imaging. Before the vertical synchronization period 228, the amplitude is at a high level 230 interspersed with events that momentarily decrease the amplitude to a low level 232 at regular intervals of horizontal synchronization 226. An amplitude step decrease 234 may be initiated at the beginning of the vertical synchronization period 228 while the video line 220 remains at high amplitude.

During the vertical synchronization period 228, the amplitude is at the low level 232 interspersed with events that momentarily increase the amplitude to the high level 230 during the regular intervals of horizontal synchronization 226. An amplitude step increase 236 may be initiated at the end of the synchronization period 228 to restore the amplitude to the high level 230 prior to the vertical synchronization period 228. Insertion or deletion of a pixel 238 may be performed during the intervals of horizontal synchronization 226 while in the vertical synchronization 228 mode. Such an operation to duplicate or eliminate a pixel adjusts the duration of the vertical synchronization period 228, without affecting the intervals of horizontal synchronization 226.

In order to accommodate a variety of time generation circuits that generate the synchronization signals, the present invention may enable either the duplication or elimination operations to be performed at any line and pixel location in the frame. By manipulating the control logic that extracts samples out of an output buffer, samples can be duplicated or eliminated by adding control signals. The control mechanism may specify the read pointer to increment by one (=1) as currently performed, by two (=2) for sample elimination or zero (=0) for sample duplication. Such a solution to synchronization by duplicating or eliminating data (rather than adjust clock frequencies) represents a simplification over the current technology with low development and maintenance risks.

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. An apparatus for synchronizing an audio/video (A/V) bitstream between a transmitting encoder for transmitting said A/V bitstream and a receiving decoder for receiving said A/V bitstream, said decoder associated with said apparatus, wherein said encoder inserts a plurality of program clock reference (PCR) time stamps into said bitstream, said apparatus comprising:

a PCR extractor for extracting the plurality of PCR time stamps from the A/V bitstream;

a local clock for generating a plurality of local time count (LTC) time stamps;

a differencer for determining a PCR increment interval from said plurality of PCR time stamps and a LTC increment interval from said plurality of LTC time stamps;

an evaluator for comparing said PCR increment interval to said LTC increment interval so as to determine an increment difference, wherein if said increment difference is nonzero said evaluator calculates an audio sample number for duplication or elimination of an audio sample in an audio bitstream and a video number of video pixels or video frames for duplication or elimination of a video pixel in a video bitstream;

an audio sample buffer for duplicating said audio sample in said audio bitstream if said increment difference is greater than zero, called underflow, and for eliminating said audio sample in said audio bitstream if said increment difference is less than zero called overflow; and a video mixer for duplicating said video pixel in said video bitstream if said increment difference is underflow, and for eliminating said video pixel in said video bitstream if said increment difference is overflow.

2. An apparatus according to claim 1 wherein said evaluator comprises:

a calculator for determining an interval difference between the PCR increment interval and said LTC increment interval as one of three possible conditions of synchronized, overflow and underflow, wherein a default condition for said interval difference is synchronized for said increment difference is zero; and an incrementor for incrementing a read pointer, wherein said incrementor increments said read pointer by one if said interval difference is synchronized, by two if said increment difference is greater than zero called overflow to eliminate a data element, or by zero if said increment difference is less than zero called underflow to duplicate said data element.

3. An apparatus according to claim 1 wherein said evaluator further comprises:

a counter for counting an audio samples number until a sample difference occurs;

a divider for dividing an audio sample rate by a said audio samples number to obtain a quotient; and a differencer for establishing said interval difference as overflow if said PCR increment interval is greater than said LTC increment interval, and as underflow if said PCR increment interval is less than said LTC increment interval.

4. An apparatus according to claim 1 wherein said video mixer further comprises:

a signal interpreter for identifying a back porch blanking period between a synchronization period and an active line period; and a differencer for establishing said interval difference as overflow if said PCR increment interval is greater than said LTC increment interval, and as underflow if said PCR increment interval is less than said LTC increment interval.

5. An apparatus according to claim 1 wherein said video mixer further comprises:

a signal interpreter for identifying a vertical synchronization period within a horizontal synchronization event; and a differencer for establishing said interval difference as overflow if said PCR increment interval is greater than said LTC increment interval, and as underflow if said PCR increment interval is less than said LTC increment interval.

6. An apparatus for synchronizing an audio bitstream between a transmitting encoder for transmitting said audio bitstream and a receiving decoder for receiving said audio bitstream, said decoder associated with said apparatus, wherein said encoder inserts a plurality of program clock reference (PCR) time stamps into said bitstream, said apparatus comprising:

a PCR extractor for extracting the plurality of PCR time stamps from the audio bitstream;

a local clock for generating a plurality of local time count (LTC) time stamps;

a differencer for determining a PCR increment interval from said plurality of PCR time stamps and a LTC increment interval from said plurality of LTC time stamps;

an evaluator for comparing said PCR increment interval to said LTC increment interval so as to determine an increment difference, wherein if said increment difference is nonzero said evaluator calculates an audio sample number for duplication or elimination of an audio sample in an audio bitstream for duplication; and an audio sample buffer for duplicating or eliminating said audio sample in said audio bitstream, wherein said evaluator comprises:

a calculator for determining an interval difference between the PCR increment interval and said LTC increment interval as one of three possible conditions of synchronized, overflow and underflow, wherein a default condition for said interval difference is synchronized for said increment difference is zero; and an incrementor for incrementing a read pointer, wherein said incrementor increments said read pointer by one if said interval difference is synchronized, by two if said increment difference is greater than zero called overflow to eliminate a data element, or by zero if said increment difference is less than zero called underflow to duplicate said data element.

7. An apparatus for synchronizing an audio bitstream between a transmitting encoder for transmitting said audio bitstream and a receiving decoder for receiving said audio bitstream, said decoder associated with said apparatus, wherein said encoder inserts a plurality of program clock reference (PCR) time stamps into said bitstream, said apparatus comprising:

a PCR extractor for extracting the plurality of PCR time stamps from the audio bitstream, a local clock for generating a plurality of local time count (LTC) time stamps;

a differencer for determining a PCR increment interval from said plurality of PCR time stamps and a LTC increment interval from said plurality of LTC time stamps;

an evaluator for comparing said PCR increment interval to said LTC increment interval so as to determine an increment difference, wherein if said increment difference is nonzero said evaluator calculates an audio sample number for duplication or elimination to an audio sample in an audio bitstream for duplication; and an audio sample buffer for duplicating or eliminating said audio sample in said audio bitstream, wherein said evaluator further comprises:

a counter for counting an audio samples number until a sample difference occurs;

a divider for dividing an audio sample rate by a said audio samples number to obtain a quotient; and a differencer for establishing said interval difference as overflow if said PCR increment interval is greater than said LTC increment interval, and as underflow if said PCR increment interval is less than said LTC increment interval.

8. An apparatus for synchronizing a video bitstream between a transmitting encoder for transmitting said video bitstream and a receiving decoder for receiving said video bitstream, said decoder associated with said apparatus, wherein said encoder inserts a plurality of program clock reference (PCR) time stamps into said bitstream, said apparatus comprising:

a PCR extractor for extracting the plurality of PCR time stamps from the video bitstream;

a local clock for generating a plurality of local time count (LTC) time stamps;

a differencer for determining a PCR increment interval from said plurality of PCR time stamps and a LTC increment interval from said plurality of LTC time stamps;

an evaluator for comparing said PCR increment interval to said LTC increment interval so as to determine an increment difference, wherein if said increment difference is nonzero said evaluator calculates a video number of video pixels or video frames for duplication or elimination of a video pixel in a video bitstream; and a video mixer for duplicating or eliminating said video pixel in said video bitstream, wherein said evaluator comprises:

a calculator for determining an interval difference between the PCR increment interval and said LTC increment interval as one of three possible conditions of synchronized, overflow and underflow, wherein a default condition for said interval difference is synchronized for said increment difference is zero; and an incrementor for incrementing a read pointer, wherein said incrementor increments said read pointer by one if said interval difference is synchronized, by two if said increment difference is greater than zero called overflow to eliminate a data element, or by zero if said increment difference is less than zero called underflow to duplicate said data element.

9. An apparatus according to claim 8 wherein said video mixer further comprises:

a signal interpreter for identifying a back porch blanking period between a synchronization period and an active line period; and a differencer for establishing said interval difference as overflow if said PCR increment interval is greater than said LTC increment interval, and as underflow if said PCR increment interval is less than said LTC increment interval.

10. An apparatus according to claim 8 wherein said video mixer further comprises:

a signal interpreter for identifying a vertical synchronization period within a horizontal synchronization event; and a differencer for establishing said interval difference as overflow if said PCR increment interval is greater than said LTC increment interval, and as underflow if said PCR increment interval is less than said LTC increment interval.

11. A method for synchronizing an audio/video (A/V) bitstream between a transmitting encoder to transmit said A/V bitstream and a receiving decoder to receive said A/V bitstream, said decoder associated with said apparatus, wherein said encoder inserts a plurality of program clock reference (PCR) time stamps into said bitstream, said method comprising:

extracting the plurality of PCR time stamps from the A/V bitstream;

determining a PCR increment interval from the plurality of PCR time stamps by a PCR differencer;

generating a plurality of local time count (LTC) time stamps by a local clock;

determining a LTC increment interval from said plurality of LTC time stamps by a LTC differencer;

comparing said PCR increment interval to said LTC increment interval in an evaluator so as to determine an increment difference, wherein said increment difference is determined by a subtrahend of said PCR increment interval minus said LTC increment interval;

calculating an audio sample number for duplication or elimination of an audio sample in an audio bitstream if said increment difference is nonzero;

calculating a video number of video pixels or video frames for duplication or elimination of a video pixel in a video bitstream if said increment difference is nonzero;

duplicating said audio sample in said audio bitstream if said increment difference is greater than zero, called underflow;

eliminating said audio sample in said audio bitstream if said increment difference is less than zero, called overflow;

duplicating said video pixel in said video bitstream if said increment difference is underflow; and eliminating said video pixel in said video bitstream if said increment difference is overflow.

12. A method for synchronizing an audio/video (A/V) bitstream between a transmitting encoder to transmit said A/V bitstream and a receiving decoder to receive said A/V bitstream, said decoder associated with said apparatus, wherein said encoder inserts a plurality of program clock reference (PCR) time stamps into said bitstream, said method comprising:

extracting the plurality of PCR time stamps from the A/V bitstream;

first determining a PCR increment interval from the plurality of PCR time stamps by a PCR differencer;

generating a plurality of local time count (LTC) time stamps by a local clock;

second determining a LTC increment interval from said plurality of LTC time stamps by a LTC differencer;

comparing said PCR increment interval to said LTC increment interval in an evaluator so as to determine an increment difference, first calculating an audio sample number for duplication or elimination of an audio sample in an audio bitstream if said increment difference is nonzero;

second calculating a video number of video pixels or video frames for duplication or elimination of a video pixel in a video bitstream if said increment difference is nonzero;

first incrementing a read pointer by one if said increment difference is synchronized;

second incrementing said read pointer by two if said increment difference is overflow to eliminate a data element, wherein a data element is said audio sample in said audio bitstream and said video pixel in said video bitstream; and third incrementing said read pointer by zero if said increment difference is underflow to duplicate said data element.

13. A method according to claim 12, said method further comprising:

counting an audio samples number until a sample difference occurs;

dividing an audio sample rate by a said audio samples number to obtain a quotient;

establishing said interval difference as overflow if said PCR increment interval is greater than said LTC increment interval; and establishing said interval difference as underflow if said PCR increment interval is less than said LTC increment interval.

14. A method according to claim 12, said method further comprising:

counting a video samples number until a sample difference occurs;

dividing a video pixel rate by a said video samples number to obtain a quotient;

establishing said interval difference as overflow if said PCR increment interval is greater than said LTC increment interval; and establishing said interval difference as underflow if said PCR increment interval is less than said LTC increment interval.

15. A method according to claim 14 wherein said determining further comprises:

identifying a back porch blanking period between a synchronization period and an active line period;

establishing said interval difference as overflow if said PCR increment interval is greater than said LTC increment interval; and establishing said interval difference as underflow if said PCR increment interval is less than said LTC increment interval.

16. A method according to claim 14 wherein said determining further comprises:

identifying a horizontal synchronization event within a vertical synchronization period;

establishing said interval difference as overflow if said PCR increment interval is greater than said LTC increment interval; and establishing said interval difference as underflow if said PCR increment interval is less than said LTC increment interval.

17. A method for synchronizing an audio bitstream between a transmitting encoder to transmit said audio bitstream and a receiving decoder to receive said audio bitstream, said decoder associated with said apparatus, wherein said encoder inserts a plurality of program clock reference (PCR) time stamps into said bitstream, said method comprising:

extracting the plurality of PCR time stamps from the audio bitstream;

first determining a PCR increment interval from the plurality of PCR time stamps by a PCR differencer;

generating a plurality of local time count (LTC) time stamps by a local clock;

second determining a LTC increment interval from said plurality of LTC time stamps by a LTC differencer;

comparing said PCR increment interval to said LTC increment interval in an evaluator so as to determine an increment difference, calculating an audio sample number for duplication or elimination of an audio sample in an audio bitstream if said increment difference is nonzero;

first incrementing a read pointer by one if said increment difference is synchronized;

second incrementing said read pointer by two if said increment difference is overflow to eliminate a data element, wherein a data element is said audio sample in said audio bitstream; and third incrementing said read pointer by zero if said increment difference is underflow to duplicate said data element.

18. A method according to claim 17, said method further comprising:

counting an audio samples number until a sample difference occurs;

dividing an audio sample rate by a said audio samples number to obtain a quotient;

establishing said interval difference as overflow if said PCR increment interval is greater than said LTC increment interval; and establishing said interval difference as underflow if said PCR increment interval is less than said LTC increment interval.

19. A method for synchronizing a video bitstream between a transmitting encoder to transmit said video bitstream and a receiving decoder to receive said video bitstream, said decoder associated with said apparatus, wherein said encoder inserts a plurality of program clock reference (PCR) time stamps into said bitstream, said method comprising:

extracting the plurality of PCR time stamps from the video bitstream, first determining a PCR increment interval from the plurality of PCR time stamps by a PCR differencer;
generating a plurality of local time count (LTC) time stamps by a local clock;
second determining a LTC increment interval from said plurality of LTC time stamps by a LTC differencer;
comparing said PCR increment interval to said LTC increment interval in an evaluator so as to determine an increment difference,
calculating a video number of video pixels or video frames for duplication or elimination of a video pixel in a video bitstream if said increment difference is nonzero;
first incrementing a read pointer by one if said increment difference is synchronized;
second incrementing said read pointer by two if said increment difference is overflow to eliminate a data element, wherein a data element is said video pixel in said video bitstream; and
third incrementing said read pointer by zero if said increment difference is underflow to duplicate said data element.

20. A method according to claim 19, said method further comprising:
counting a video samples number until a sample difference occurs;
dividing a video pixel rate by a said video samples number to obtain a quotient;
establishing said interval difference as overflow if said PCR increment interval is greater than said LTC increment interval; and
establishing said interval difference as underflow if said PCR increment interval is less than said LTC increment interval.

21. A method according to claim 20 wherein said determining further comprises:
identifying a back porch blanking period between a synchronization period and an active line period;
establishing said interval difference as overflow if said PCR increment interval is greater than said LTC increment interval; and
establishing said interval difference as underflow if said PCR increment interval is less than said LTC increment interval.

22. A method according to claim 20 wherein said determining further comprises:
identifying a horizontal synchronization event within a vertical synchronization period;
establishing said interval difference as overflow if said PCR increment interval is greater than said LTC increment interval; and
establishing said interval difference as underflow if said PCR increment interval is less than said LTC increment interval.

23. A programmable storage device readable by a machine tangibly embodying a program of instructions executable by the machine to perform a method for synchronizing an audio/video (A/V) bitstream between a transmitting encoder to transmit said A/V bitstream and a receiving decoder to receive said A/V bitstream, said decoder associated with said apparatus, wherein said encoder inserts a plurality of program clock reference (PCR) time stamps into said bitstream, said method comprising:
extracting the plurality of PCR time stamps from the A/V bitstream;
determining a PCR increment interval from the plurality of PCR time stamps by a PCR differencer;
generating a plurality of local time count (LTC) time stamps by a local clock;
determining a LTC increment interval from said plurality of LTC time stamps by a LTC differencer;
comparing said PCR increment interval to said LTC increment interval in an evaluator so as to determine an increment difference, wherein said increment difference is determined by a subtrahend of said PCR increment interval minus said LTC increment interval;
calculating an audio sample number for duplication or elimination of an audio sample in an audio bitstream if said increment difference is nonzero;
calculating a video number of video pixels or video frames for duplication or elimination of a video pixel in a video bitstream if said increment difference is nonzero;
duplicating said audio sample in said audio bitstream if said increment difference is greater than zero, called underflow;
eliminating said audio sample in said audio bitstream if said increment difference is less than zero, called overflow;
duplicating said video pixel in said video bitstream if said increment difference is underflow; and
eliminating said video pixel in said video bitstream if said increment difference is overflow.

24. A programmable storage device readable by a machine tangibly embodying a program of instructions executable by the machine to perform a method for synchronizing an audio/video (A/V) bitstream between a transmitting encoder to transmit said A/V bitstream and a receiving decoder to receive said A/V bitstream, said decoder associated with said apparatus, wherein said encoder inserts a plurality of program clock reference (PCR) time stamps into said bitstream, said method comprising:
extracting the plurality of PCR time stamps from the A/V bitstream;
first determining a PCR increment interval from the plurality of PCR time stamps by a PCR differencer;
generating a plurality of local time count (LTC) time stamps by a local clock;
second determining a LTC increment interval from said plurality of LTC time stamps by a LTC differencer;
comparing said PCR increment interval to said LTC increment interval in an evaluator so as to determine an increment difference,
first calculating an audio sample number for duplication or elimination of an audio sample in an audio bitstream if said increment difference is nonzero;
second calculating a video number of video pixels or video frames for duplication or elimination of a video pixel in a video bitstream if said increment difference is nonzero;
first incrementing a read pointer by one if said increment difference is synchronized;
second incrementing said read pointer by two if said increment difference is overflow to eliminate a data element, wherein a data element is said audio sample in said audio bitstream and said video pixel in said video bitstream; and
third incrementing said read pointer by zero if said increment difference is underflow to duplicate said data element.

25. A programmable storage device according to claim 24, said method further comprising:
- counting an audio samples number until a sample difference occurs;
- dividing an audio sample rate by a said audio samples number to obtain a quotient;
- establishing said interval difference as overflow if said PCR increment interval is greater than said LTC increment interval; and
- establishing said interval difference as underflow if said PCR increment interval is less than said LTC increment interval.

26. A programmable storage device according to claim 24, said method further comprising:
- counting a video samples number until a sample difference occurs;
- dividing a video pixel rate by a said video samples number to obtain a quotient;
- establishing said interval difference as overflow if said PCR increment interval is greater than said LTC increment interval; and
- establishing said interval difference as underflow if said PCR increment interval is less than said LTC increment interval.

27. A programmable storage device according to claim 26 wherein said determining further comprises:
- identifying a back porch blanking period between a synchronization period and an active line period;
- establishing said interval difference as overflow if said PCR increment interval is greater than said LTC increment interval; and
- establishing said interval difference as underflow if said PCR increment interval is less than said LTC increment interval.

28. A programmable storage device according to claim 26 wherein said determining further comprises:
- identifying a vertical synchronization period within a horizontal synchronization event;
- establishing said interval difference as overflow if said PCR increment interval is greater than said LTC increment interval; and
- establishing said interval difference as underflow if said PCR increment interval is less than said LTC increment interval.

29. A programmable storage device readable by a machine tangibly embodying a program of instructions executable by the machine to perform a method for synchronizing an audio bitstream between a transmitting encoder to transmit said audio bitstream and a receiving decoder to receive said audio bitstream, said decoder associated with said apparatus, wherein said encoder inserts a plurality of program clock reference (PCR) time stamps into said bitstream, said method comprising:
- extracting the plurality of PCR time stamps from the audio bitstream;
- first determining a PCR increment interval from the plurality of PCR time stamps by a PCR differencer;
- generating a plurality of local time count (LTC) time stamps by a local clock;
- second determining a LTC increment interval from said plurality of LTC time stamps by a LTC differencer;
- comparing said PCR increment interval to said LTC increment interval in an evaluator so as to determine an increment difference,
- calculating an audio sample number for duplication or elimination of an audio sample in an audio bitstream if said increment difference is nonzero;
- first incrementing a read pointer by one if said increment difference is synchronized;
- second incrementing said read pointer by two if said increment difference is overflow to eliminate a data element, wherein a data element is said audio sample in said audio bitstream; and
- third incrementing said read pointer by zero if said increment difference is underflow to duplicate said data element.

30. A programmable storage device according to claim 29, said method further comprising:
- counting an audio samples number until a sample difference occurs;
- dividing an audio sample rate by a said audio samples number to obtain a quotient;
- establishing said interval difference as overflow if said PCR increment interval is greater than said LTC increment interval; and
- establishing said interval difference as underflow if said PCR increment interval is less than said LTC increment interval.

31. A programmable storage device readable by a machine tangibly embodying a program of instructions executable by the machine to perform a method for synchronizing a video bitstream between a transmitting encoder to transmit said video bitstream and a receiving decoder to receive said video bitstream, said decoder associated with said apparatus, wherein said encoder inserts a plurality of program clock reference (PCR) time stamps into said bitstream, said method comprising:
- extracting the plurality of PCR time stamps from the video bitstream;
- first determining a PCR increment interval from the plurality of PCR time stamps by a PCR differencer;
- generating a plurality of local time count (LTC) time stamps by a local clock;
- second determining a LTC increment interval from said plurality of LTC time stamps by a LTC differencer;
- comparing said PCR increment interval to said LTC increment interval in an evaluator so as to determine an increment difference,
- calculating a video number of video pixels or video frames for duplication or elimination of a video pixel in a video bitstream if said increment difference is nonzero;
- first incrementing a read pointer by one if said increment difference is synchronized;
- second incrementing said read pointer by two if said increment difference is overflow to eliminate a data element, wherein a data element is said video pixel in said video bitstream; and
- third incrementing said read pointer by zero if said increment difference is underflow to duplicate said data element.

32. A programmable storage device according to claim 31, said method further comprising:
- counting a video samples number until a sample difference occurs;
- dividing a video pixel rate by a said video samples number to obtain a quotient;
- establishing said interval difference as overflow if said PCR increment interval is greater than said LTC increment interval; and establishing said interval difference as underflow if said PCR increment interval is less than said LTC increment interval.

33. A programmable storage device according to claim 32 herein said determining further comprises:
identifying a back porch blanking period between a synchronization period and an active line period;
establishing said interval difference as overflow if said PCR increment interval is greater than said LTC increment interval; and
establishing said interval difference as underflow if said PCR increment interval is less than said LTC increment interval.

34. A programmable storage device according to claim 32 wherein said determining further comprises:
identifying a horizontal synchronization event within a vertical synchronization period;
establishing said interval difference as overflow if said PCR increment interval is greater than said LTC increment interval; and
establishing said interval difference as underflow if said PCR increment interval is less than said LTC increment interval.

35. An apparatus for synchronizing an audio/video (A/V) bitstream between a transmitting encoder to transmit said A/V bitstream and a receiving decoder to receive said A/V bitstream, said decoder associated with said apparatus, wherein said encoder inserts a plurality of program clock reference (PCR) time stamps into said bitstream, said apparatus comprising:
means for extracting the plurality of PCR time stamps from the A/V bitstream;
means for determining a PCR increment interval from the plurality of PCR time stamps;
means for generating a plurality of local time count (LTC) time stamps by a local clock;
means for determining a LTC increment interval from said plurality of LTC time stamps;
means for comparing said PCR increment interval to said LTC increment interval so as to determine an increment difference, wherein said increment difference is determined by a subtrahend of said PCR increment interval minus said LTC increment interval;
means for calculating an audio sample number for duplication or elimination of an audio sample in an audio bitstream if said increment difference is nonzero;
means for calculating a video number of video pixels or video frames for duplication or elimination of a video pixel in a video bitstream if said increment difference is nonzero;
means for duplicating said audio sample in said audio bitstream if said increment difference is greater than zero, called underflow;
means for eliminating said audio sample in said audio bitstream if said increment difference is less than zero, called overflow;
means for duplicating said video pixel in said video bitstream if said increment difference is underflow; and
means for eliminating said video pixel in said video bitstream if said increment difference is overflow.

36. An apparatus for synchronizing an audio/video (A/V) bitstream between a transmitting encoder to transmit said A/V bitstream and a receiving decoder to receive said A/V bitstream, said decoder associated with said apparatus, wherein said encoder inserts a plurality of program clock reference (PCR) time stamps into said bitstream, said apparatus comprising:
means for extracting the plurality of PCR time stamps from the A/V bitstream;
means for first determining a PCR increment interval from the plurality of PCR time stamps;
means for generating a plurality of local time count (LTC) time stamps by a local clock;
means for determining a LTC increment interval from said plurality of LTC time stamps;
means for comparing said PCR increment interval to said LTC increment interval in an evaluator so as to determine an increment difference,
means for calculating an audio sample number for duplication or elimination of an audio sample in an audio bitstream if said increment difference is nonzero;
means for calculating a video number of video pixels or video frames for duplication or elimination of a video pixel in a video bitstream if said increment difference is nonzero;
means for incrementing a read pointer by one if said increment difference is synchronized;
means for incrementing said read pointer by two if said increment difference is overflow to eliminate a data element, wherein a data element is said audio sample in said audio bitstream and said video pixel in said video bitstream; and
means for incrementing said read pointer by zero if said increment difference is underflow to duplicate said data element.

37. An apparatus according to claim 36, said apparatus further comprising:
means for counting an audio samples number until a sample difference occurs;
means for dividing an audio sample rate by a said audio samples number to obtain a quotient;
means for establishing said interval difference as overflow if said PCR increment interval is greater than said LTC increment interval; and
means for establishing said interval difference as underflow if said PCR increment interval is less than said LTC increment interval.

38. An apparatus according to claim 36, said apparatus further comprising:
means for counting a video samples number until a sample difference occurs;
means for dividing a video pixel rate by a said video samples number to obtain a quotient;
means for establishing said interval difference as overflow if said PCR increment interval is greater than said LTC increment interval; and
means for establishing said interval difference as undertflow if said PCR increment interval is less than said LTC increment interval.

39. An apparatus according to claim 38 wherein said determining further comprises:
means for identifying a back porch blanking period between a synchronization period and an active line period;
means for establishing said interval difference as overflow if said PCR increment interval is greater than said LTC increment interval; and means for establishing said interval difference as underflow if said PCR increment interval is less than said LTC increment interval.

40. An apparatus according to claim 38 wherein said determining further comprises:
   means for identifying a horizontal synchronization event within a vertical synchronization period;
   means for establishing said interval difference as overflow if said PCR increment interval is greater than said LTC increment interval; and
   means for establishing said interval difference as underflow if said PCR increment interval is less than said LTC increment interval.

41. An apparatus for synchronizing an audio bitstream between a transmitting encoder to transmit said audio bitstream and a receiving decoder to receive said audio bitstream, said decoder associated with said apparatus, wherein said encoder inserts a plurality of program clock reference (PCR) time stamps into said bitstream, said apparatus comprising:
   means for extracting the plurality of PCR time stamps from the audio bitstream;
   means for determining a PCR increment interval from the plurality of PCR time stamps;
   means for generating a plurality of local time count (LTC) time stamps by a local clock;
   means for determining a LTC increment interval from said plurality of LTC time stamps;
   means for comparing said PCR increment interval to said LTC increment interval in an evaluator so as to determine an increment difference,
   means for calculating an audio sample number for duplication or elimination of an audio sample in an audio bitstream if said increment difference is nonzero;
   means for incrementing a read pointer by one if said increment difference is synchronized;
   means for incrementing said read pointer by two if said increment difference is overflow to eliminate a data element, wherein a data element is said audio sample in said audio bitstream; and
   means for incrementing said read pointer by zero if said increment difference is underflow to duplicate said data element.

42. An apparatus according to claim 41, said apparatus further comprising:
   means for counting an audio samples number until a sample difference occurs;
   means for dividing an audio sample rate by a said audio samples number to obtain a quotient;
   means for establishing said interval difference as overflow if said PCR increment interval is greater than said LTC increment interval; and
   means for establishing said interval difference as underflow if said PCR increment interval is less than said LTC increment interval.

43. An apparatus for synchronizing a video bitstream between a transmitting encoder to transmit said video bitstream and a receiving decoder to receive said video bitstream, said decoder associated with said apparatus, wherein said encoder inserts a plurality of program clock reference (PCR) time stamps into said bitstream, said apparatus comprising:
   means for extracting the plurality of PCR time stamps from the video bitstream;
   means first determining a PCR increment interval from the plurality of PCR time stamps;
   means for generating a plurality of local time count (LTC) time stamps by a local clock;
   means for second determining a LTC increment interval from said plurality of LTC time stamps;
   means for comparing said PCR increment interval to said LTC increment interval in an evaluator so as to determine an increment difference,
   means for calculating a video number of video pixels or video frames for duplication or elimination of a video pixel in a video bitstream if said increment difference is nonzero;
   means for incrementing a read pointer by one if said increment difference is synchronized;
   means for incrementing said read pointer by two if said increment difference is overflow to eliminate a data element, wherein a data element is said video pixel in said video bitstream; and
   means for incrementing said read pointer by zero if said increment difference is underflow to duplicate said data element.

44. An apparatus according to claim 43, said apparatus further comprising:
   means for counting a video samples number until a sample difference occurs;
   means for dividing a video pixel rate by a said video samples number to obtain a quotient;
   means for establishing said interval difference as overflow if said PCR increment interval is greater than said LTC increment interval; and
   means for establishing said interval difference as underflow if said PCR increment interval is less than said LTC increment interval.

45. An apparatus according to claim 44, wherein said determining further comprises:
   means for identifying a back porch blanking period between a synchronization period and an active line period;
   means for establishing said interval difference as overflow if said PCR increment interval is greater than said LTC increment interval; and
   means for establishing said interval difference as underflow if said PCR increment interval is less than said LTC increment interval.

46. An apparatus according to claim 44 wherein said determining further comprises:
   means for identifying a horizontal synchronization event within a vertical synchronization period;
   means for establishing said interval difference as overflow if said PCR increment interval is greater than said LTC increment interval; and
   means for establishing said interval difference as underflow if said PCR increment interval is less than said LTC increment interval.

* * * * *